Nov. 3, 1953     A. C. HUSSNIGG     2,657,617
APPARATUS FOR THE COMPRESSION OF THE GROOVES
OF HELICALLY GROOVED TUBES AND HOSES
Filed Aug. 5, 1947

INVENTOR
AUGUST CARL HUSSNIGG
By Frederick G. Harry
ATTORNEY

UNITED STATES PATENT OFFICE 2,657,617

APPARATUS FOR THE COMPRESSION OF THE GROOVES OF HELICALLY GROOVED TUBES AND HOSES

August Carl Hussnigg, Zurich, Switzerland

Application August 5, 1947, Serial No. 766,314
In Switzerland October 10, 1944

Section 1, Public Law 690, August 8, 1946
Patent expires October 10, 1964

2 Claims. (Cl. 93—77)

This invention relates to machines for manufacturing endless helically grooved hoses or tubing from band material.

With machines of the general type above referred to, as hitherto known, the band material is fed with overlap from rotating supply spools to a mandrel. The tube so formed is drawn from the mandrel through a threaded member for effecting grooving or corrugating of the tube. To attain the desired tightness and stability of the grooves formed by means of the threaded member, the tube must be further compressed by retarding the forward travel of the tube so that the flanks of the grooves are forced more closely together. The obstruction of the forward travel of the tube has been hitherto accomplished by friction within a fitting through which the tube is forced. This fitting may for example comprise a ring, the bore of which is suitably adapted to the outer diameter of the tube, or adjustably clamping jaws, or a suitable core placed in the interior of the tube and similar devices.

In certain instances, it is desirable that the grooves formed in the tubes and hoses are not forced so tightly together that the tube flanks completely abut against each other as was necessarily caused by the previously described retarding means but that a more or less wide gap remains between the flanks of the grooves, for example to reduce the weight of the tube, to save material, to vary the flexibility or the like.

According to the present invention, tubes can be made with any selective width of the gaps between adjoining grooves by retarding the progress of the tube, when emerging from the threaded member, by means of a second threaded member rotating with the same speed and in the same direction as the first member effecting the formation of the helical grooves. The second threaded member serving to retard the forward travel of the tube can either comprise an outer portion encompassing the outside of the tube and having an inner thread or a screw having an outer thread fitting the inside of the tube and also a combination of an outer portion with inner thread and a screw with outer thread. The second threaded member can be arranged and rotated separately from the first member or it can be arranged as a continuation of the first member and be made integral with the first member or be rigidly connected therewith.

In the accompanying drawing several embodiments of the invention are diagrammatically shown.

Figure 1:
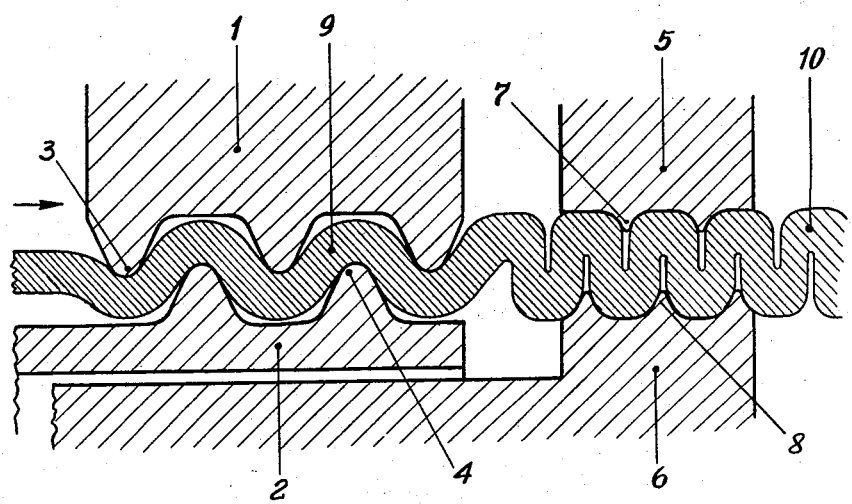
Figure 2:
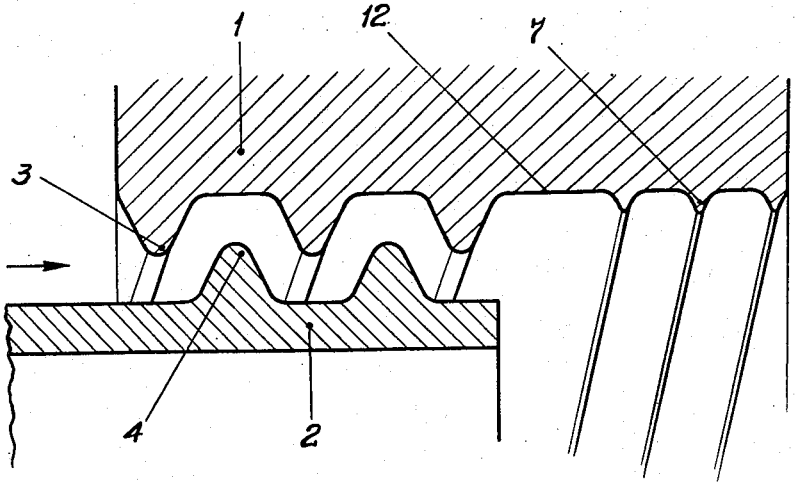

Fig. 1 shows a longitudinal sectional view through the first threaded member for forming the helical grooves and through the second threaded member disposed behind the first member as seen in the direction of the travel of the tube for compressing the tube after passage through the first member, and Fig. 2 shows a longitudinal sectional view of a modification of the invention.

Referring now to Fig. 1 in detail, there is shown a first or anterior threaded member comprising an outer portion 1 having an inner thread 3 and an inner or screw portion 2 having an outer thread 4. The inner and outer portion of the member are rotatable in the same direction. A tube 9 formed on a mandrel (not shown) by winding of band material thereon is continuously drawn off the mandrel by means of the first threaded member in the direction of the arrow. As the tube passes between outer portion 1 and screw 2, while these elements are rotating, helical grooves are formed in the tube wall and the tube emerges as a helically grooved tube.

The second or posterior threaded member which serves to compress tube 9 when emerging from the first threaded member by retarding the travel of the tube in the direction of the arrow also comprises an outer portion 5 having an internal thread 7 and an inner or screw portion 6 having an external thread 8. Portions 5 and 6 are rotated in the same direction as portions 1 and 2.

The pitch and the number of threads 7 and 8 correspond to and control the pitch and number of the helical grooves of the finished tube. As can best be seen on Fig. 1, the pitch of threads 3 and 4 and of threads 7 and 8 are different. As a result, grooved tube 9, when emerging from the anterior member and entering the posterior member, is retarded in its forward movement, whereby the grooves of the tube between each two adjoining threads are compressed. It will be evident that by selecting the pitch of threads 7 and 8 higher or lower relative to the pitch of threads 3 and 4, wider or narrower gaps between the flanks of the grooves can be obtained in the finished tube.

Portions 5 and 6 of the posterior member can be arranged and rotated separately as shown on Fig. 1 or can be rigidly connected with the respective portions 1 and 2 of the anterior member.

In certain instances depending upon the specific properties of the material to be grooved, it is sufficient to employ only the outer portion 5 of the posterior member for the purpose of accomplishing the desired retarding effect. Similarly, in certain instances the inner or screw portion 6 only may be provided.

According to the embodiment shown in Fig. 2, the outer portions of the two threaded members are rigidly connected to form an integral unit, threads 3 and 7 being separated by a smooth portion 12.

As will be noted, the inner or screw portion 6 of the posterior member is omitted in the modification according to Fig. 2.

For the purpose of correcting or balancing the torsional stresses occurring in the tube by reason of the retardation of the tube travel and the resulting compression of the grooves, portions 5 and 6 of the posterior member may be rotated with a lower speed than portions 1 and 2 of the anterior member.

To dissipate the heat developed during the grooving operation, particularly when thicker material is worked, the grooving operation and the subsequent compression of the grooves may be carried out in two or more stages. For this purpose, a plurality of threaded members having constantly decreasing thread pitches may be arranged, one behind the other as seen in the direction of the travel of the tube.

What is claimed is:

1. A machine for helically grooving smooth continuous hose and tubing material wound of strip material and fed through the machine in a continuous flow, the said machine comprising in combination rotatable grooving means and rotatable retarding means, each of the said means including two cylindrical wall members concentrically disposed and facing each other radially spaced apart for forming an annular channel therebetween, one wall member of each of said means having an internal thread and the other wall member having an external thread, the threads of the retarding means having a lower pitch than the threads of the grooving means, the teeth on the two wall members defining the channel of the grooving means being disposed in such special relationship to each other and of such length that the teeth on one wall member extend between respective teeth on the other wall member, the said two means being rotatable in the same direction and disposed spaced apart in the direction of the feed of the material, the grooving means being anterior and the retarding means posterior in the direction of the feed of the material through the machine, whereby material fed through the two channels is helically grooved within the anterior channel and compressed in the direction of travel within the posterior channel.

2. A machine according to claim 1, wherein the grooving means are rotatable at a greater speed than the retarding means.

AUGUST CARL HUSSNIGG.

References Cited in the file of this patent

UNITED STATES PATENTS

| Number | Name | Date |
| --- | --- | --- |
| 1,120,269 | Brinkman | Dec. 8, 1914 |
| 2,002,896 | Kopetz | May 28, 1935 |
| 2,033,717 | Kopetz | Mar. 10, 1936 |